United States Patent
Oh et al.

(10) Patent No.: US 8,329,804 B2
(45) Date of Patent: Dec. 11, 2012

(54) FLAME RETARDANT THERMOPLASTIC RESIN COMPOSITION

(75) Inventors: In Hwan Oh, Uiwang-si (KR); Sung Hee Ahn, Uiwang-si (KR); Sung Duk Hwang, Uiwang-si (KR); Se Bum Son, Uiwang-si (KR); Seong Ho Kong, Uiwang-si (KR); Hye Jin Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 406 days.

(21) Appl. No.: 12/613,584

(22) Filed: Nov. 6, 2009

(65) Prior Publication Data

US 2010/0152372 A1    Jun. 17, 2010

(30) Foreign Application Priority Data

Dec. 17, 2008   (KR) .............................. 2008-128424

(51) Int. Cl.
C08K 5/02       (2006.01)
C08L 25/00      (2006.01)

(52) U.S. Cl. ........................................ 524/464; 524/577
(58) Field of Classification Search .................. 524/464, 524/412, 409, 504, 577
See application file for complete search history.

(56) References Cited

U.S. PATENT DOCUMENTS

| | | | |
|---|---|---|---|
| 4,027,073 A | 5/1977 | Clark | |
| 4,585,818 A | 4/1986 | Jung et al. | |
| 4,994,515 A | 2/1991 | Washiyama et al. | |
| 5,039,729 A | 8/1991 | Brackenridge et al. | |
| 5,055,235 A | 10/1991 | Brackenridge et al. | |
| 5,290,855 A | 3/1994 | Kodama et al. | |
| 5,635,565 A | 6/1997 | Miyajima et al. | |
| 5,712,336 A | 1/1998 | Gareiss et al. | |
| 5,989,723 A | 11/1999 | Tsai et al. | |
| 6,117,371 A | 9/2000 | Mack | |
| 6,447,913 B1 | 9/2002 | Watanabe et al. | |
| 7,288,587 B2 | 10/2007 | Saitou et al. | |
| 2001/0041772 A1 | 11/2001 | Masubuchi et al. | |
| 2005/0137311 A1 | 6/2005 | Muylem et al. | |
| 2007/0049674 A1* | 3/2007 | Kim et al. | 524/409 |
| 2008/0088961 A1 | 4/2008 | Kushida | |
| 2008/0160240 A1 | 7/2008 | Son et al. | |
| 2008/0221255 A1 | 9/2008 | Ahn et al. | |
| 2010/0029828 A1 | 2/2010 | Ahn et al. | |
| 2010/0041800 A1 | 2/2010 | Son et al. | |
| 2010/0113648 A1 | 5/2010 | Niessner et al. | |
| 2010/0152342 A1 | 6/2010 | Kong et al. | |
| 2010/0168292 A1 | 7/2010 | Son et al. | |
| 2010/0168315 A1 | 7/2010 | Park et al. | |
| 2010/0249314 A1 | 9/2010 | Park et al. | |

FOREIGN PATENT DOCUMENTS

| | | |
|---|---|---|
| EP | 0347116 * | 12/1989 |
| EP | 0489912 A1 | 6/1992 |
| EP | 502333 A1 * | 9/1992 |
| EP | 0502333 A1 | 9/1992 |
| JP | 01-163243 A | 6/1989 |
| JP | 01-263149 A | 10/1989 |
| JP | 01-304153 A | 12/1989 |
| JP | 05-295196 A | 11/1993 |
| JP | 05-339479 A | 12/1993 |
| JP | 06-322200 A | 11/1994 |
| JP | 08-311300 A | 11/1996 |
| JP | 10-175893 * | 6/1998 |
| JP | 2001-139742 | 5/2001 |
| JP | 14-97374 A | 4/2002 |
| JP | 2005-272640 A | 10/2005 |
| JP | 18-111787 A | 4/2006 |
| JP | 2006-143955 | 6/2006 |
| JP | 2007-314619 | 12/2007 |
| KR | 10-1991-0000910 A | 1/1991 |
| KR | 910008803 B1 | 10/1991 |
| KR | 10-1994-0026146 A | 12/1994 |
| KR | 159256 B1 | 1/1999 |
| KR | 2003-0056039 A | 7/2003 |
| KR | 10-2004-0022374 A | 3/2004 |
| KR | 2004-0079118 A | 9/2004 |
| WO | 90/15103 A1 | 12/1990 |
| WO | 92/00351 A1 | 1/1992 |
| WO | 2008/082138 A1 | 7/2008 |
| WO | 2009/084808 A1 | 7/2009 |

OTHER PUBLICATIONS

Office Action in commonly owned U.S. Appl No. 12/797,645, mailed on Apr. 22, 2011, pp. 1-7.
Notice of Allowance in commonly owned U.S. Appl. No. 12/647,620, mailed on Oct. 11, 2011, pp. 1-9.
Final Office Action in commonly owned U.S. Appl. No. 12/647,601 mailed Aug. 8, 2011, pp. 1-6.
Advisory Action in commonly owned U.S. Appl. No. 12/647,601 mailed Nov. 16, 2011, pp. 1-3.
Notice of Allowance in commonly owned U.S. Appl. No. 12/797,645 mailed Aug. 19, 2011, pp. 1-6.
Office Action in commonly owned U.S. Appl. No. 12/884,576 mailed Dec. 22, 2011, pp. 1-8.
Final Office Action in commonly owned U.S. Appl. No. 12/628,258, mailed on Sep. 12, 2011, pp. 1-10.
Notice of Allowance in commonly owned U.S. Appl. No. 12/628,258, mailed on Feb. 6, 2012, pp. 1-7.

(Continued)

Primary Examiner — Hui Chin
(74) Attorney, Agent, or Firm — Summa, Additon & Ashe, P.A.

(57) ABSTRACT

A flame retardant thermoplastic resin composition comprises 100 parts by weight of a rubber-modified aromatic vinyl copolymer resin (A) and about 10 to about 30 parts by weight of a brominated diphenyl ethane mixture (B) including about 55 to about 85% by weight of hexabromodiphenyl ethane. The rubber modified aromatic vinyl copolymer resin (A) according to the present invention is a polymer resin wherein grafted rubbery polymers are dispersed in the form of particles in a matrix of vinyl copolymer. The rubber-modified aromatic vinyl copolymer resin (A) includes grafted rubbery polymers in an amount of about 10 to about 100% by weight and the matrix of vinyl copolymer in an amount of about 0 to about 90% by weight. The brominated diphenyl ethane mixture (B) may have about 1 to about 25% by weight of diphenyl ethane having an odd number of bromine substituents.

6 Claims, No Drawings

OTHER PUBLICATIONS

Advisory Action in commonly owned U.S. Appl. No. 12/037,123 mailed on Oct. 18, 2010, pp. 1-3.
International Preliminary Report on Patentability in commonly owned International Application No. PCT/KR2007/006833 dated Jun. 30, 2009, pp. 1-4.
Office Action in commonly owned U.S. Appl. No. 12/538,266, mailed on Oct. 27, 2010, pp. 1-7.
Office Action in commonly owned U.S. Appl. No. 12/037,123 mailed on Jan. 25, 2010, pp. 1-11.
Final Office Action in commonly owned U.S. Appl. No. 12/037,123 mailed on Jun. 29, 2010, pp. 1-10.
International Search Report in commonly owned International Application No. PCT/KR2007/006833, dated Mar. 25, 2008, pp. 1-2.
Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf, pp. 1-3, 2009.
Machine Translation of JP 2005-272640A, downloaded from http://www19.ipdl.inpit.go.jp/PA1/cgi-bin/PA1DETAIL, Jun. 23, 2009, pp. 1-13.
Office Action in commonly owned U.S. Appl. No. 12/647,620, mailed on Jan. 31, 2011, pp. 1-10.
Office Action in commonly owned U.S. Appl. No. 12/628,258, mailed on Mar. 24, 2011, pp. 1-22.
Advisory Action in commonly owned U.S. Appl. No. 11/965,013 mailed on May 7, 2010, pp. 1-9.
Final Office Action in commonly owned U.S. Appl. No. 11/965,013, mailed on Jan. 28, 2010, pp. 1-17.
Office Action in commonly owned U.S. Appl. No. 11/965,013, mailed on Jul. 1, 2009, pp. 1-18.
Notice of Allowance in commonly owned U.S. Appl. No. 12/037,123 mailed on Feb. 1, 2011, pp. 1-8.
Chinese Office Action in commonly owned Chinese Application No. 200910166160 dated Nov. 29, 2010, pp. 1-5.
English translation of Chinese Office Action in commonly owned Chinese Application No. 200910166160 dated Nov. 29, 2010, pp. 1-6.
International Search Report in commonly owned International Application No. PCT/KR2008/006528, dated Jun. 1, 2009, pp. 1-4.
Notice of Allowance in commonly owned U.S. Appl. No. 12/538,266 mailed on Feb. 17, 2011, pp. 1-8.
Office Action in commonly owned U.S. Appl. No. 12/512,134, mailed on Apr. 21, 2010, pp. 1-6.
Final Office Action in commonly owned U.S. Appl. No. 12/512,134, mailed on Aug. 27, 2010, pp. 1-5.
Office Action in commonly owned U.S. Appl. No. 12/797,645, mailed on Apr. 22, 2011, pp. 1-7.
BASF, Joncryl ADR-4370-S, Mar. 13, 2007, pp. 1-9.
Villalobos et al., "Oligomeric chain extenders for economic reprocessing and recycling of condensation plastics," ScineceDirect, Energy 31, 2006, pp. 3227-3234.
Office Action in commonly owned U.S. Appl. No. 12/647,601, mailed on Apr. 21, 2011, pp. 1-11.
Notice of Allowance in commonly owned U.S. Appl. No. 12/512,134 mailed on Mar. 8, 2011, pp. 1-5.
Korean Office Action in commonly owned Korean Application No. 2008-128424 dated May 27, 2011, pp. 1-4.

* cited by examiner

FLAME RETARDANT THERMOPLASTIC RESIN COMPOSITION

CROSS REFERENCE TO RELATED APPLICATION

This application claims priority from Korean Patent Application No. 2008-128424, filed Dec. 17, 2008, in the Korean Intellectual Property Office, the disclosure of which is incorporated herein by reference in its entirety.

FIELD OF THE INVENTION

The present invention relates to flame retardant thermoplastic resin compositions.

BACKGROUND OF THE INVENTION

Rubber modified aromatic vinyl copolymer resins such as acrylonitrile-butadiene-styrene (ABS) resins can have excellent mold processability, physical properties such as impact strength, and appearance and have accordingly been widely used in the production of many electric or electronic goods such as automobile interiors, office equipment, displays and the like. Rubber modified aromatic vinyl copolymer resins, however, can have limited flame retardancy and thus can have limited use in the production of heat-emitting products such as computers and facsimile machines and high voltage equipment.

An exemplary method for providing rubber modified aromatic vinyl copolymer resins with desirable flame retardancy is to employ a flame retardant. In general, there are two types of flame retardants, halogenated flame retardants and non-halogenated flame retardants.

There are two important halogenated flame retardants, chlorinated flame retardants and brominated flame retardants. Chlorinated flame retardants are not typically desirable because they can cause corrosion on manufacturing equipment. The use of brominated flame retardants is regulated due to environmental contamination.

Accordingly, various non-halogenated flame retardants have been developed for use in rubber modified aromatic vinyl copolymer resins. However, the non-halogenated flame retardants typically cannot meet strict flame retardancy regulations and/or provide desired heat resistance.

Among the flame retardants, brominated flame retardants has been a target for improving flame retardancy of rubber modified aromatic vinyl copolymer resins because brominated flame retardants can provide excellent flame retardancy as well as heat resistance even when used in a small amount. As molded articles including using the rubber modified aromatic vinyl copolymer resin become larger and more complicated, yet also thinner, it is important to impart excellent flame retardancy to the thin molded articles or thin films. Brominated flame retardants can provide such thin molded articles or thin films with desirable flame retardancy.

Brominated flame retardants include tetrabromobisphenol A, brominated epoxy compounds, 2, 4, 6-tris(2, 4, 6-tribromophenoxy)-1, 3, 5-triazine (TTPT), decabromodiphenyl ethane and the like. Tetrabromobisphenol A has good flowability, but poor impact strength and heat stability. Brominated epoxy compounds have better heat stability than tetrabromobisphenol A, but poor impact strength. To overcome the poor impact strength of brominated epoxy compounds, more rubber should be used. TTPT can improve impact strength, but can cause a problem on the surface of the molded articles by generating gas due to poor heat stability. Decabromodiphenyl ethane can have excellent heat stability, but poor impact strength because of poor compatibility with ABS resin.

SUMMARY OF THE INVENTION

Accordingly, the present inventors have developed a new brominated flame retardant which contains a certain amount of hexabromodiphenyl ethane, and which can provide a thermoplastic resin composition with excellent flame retardancy as well as a balance of physical properties such as heat resistance, impact strength and moldability.

The present inventors have further developed flame retardant thermoplastic resin compositions which comprise about 100 parts by weight of a rubber-modified aromatic vinyl copolymer resin (A), and about 10 to about 30 parts by weight of a brominated diphenyl ethane mixture (B) including about 55 to about 85% by weight of hexabromodiphenyl ethane.

The flame retardant thermoplastic resin compositions of the invention can exhibit excellent flame retardancy, for example a flame retardancy of V-0 even using reduced or smaller amounts of flame retardant. The flame retardant thermoplastic resin compositions of the invention can further exhibit a balance of physical properties such as heat resistance, impact strength and moldability. The present invention further provides flame retardant thermoplastic resin compositions having excellent processability during a molding process, so that the compositions can be used to produce large, complicated and thin molded articles without generating poor surface appearance.

The rubber modified aromatic vinyl copolymer resin (A) according to the present invention is a polymer resin wherein grafted rubbery polymers (A1) are dispersed in the form of particles in a matrix of vinyl copolymer (A2). The rubber-modified aromatic vinyl copolymer resin (A) can include the grafted rubbery polymers (A1) in an amount of about 10 to about 100% by weight and the matrix of vinyl copolymer (A2) in an amount of about 0 to about 90% by weight.

The brominated diphenyl ethane mixture (B) may have about 1 to about 25% by weight of diphenyl ethane having an odd number of bromine substituents.

In an exemplary embodiment of the present invention, the brominated diphenyl ethane mixture may comprise about 0 to about 17% by weight of pentabromodiphenyl ethane, about 55 to about 85% by weight of hexabromodiphenyl ethane, about 0.5 to about 17% by weight of heptabromodiphenyl ethane, about 0 to about 25% by weight of octabromodiphenyl ethane, and about 0 to about 9% by weight of nonabromodiphenyl ethane.

In another exemplary embodiment of the present invention, the brominated diphenyl ethane mixture may comprise about 7 to about 17% by weight of pentabromodiphenyl ethane, about 75 to about 85% by weight of hexabromodiphenyl ethane, and about 3 to about 8% by weight of heptabromodiphenyl ethane.

In another exemplary embodiment of the present invention, the brominated diphenyl ethane mixture may comprise about 0.1 to about 5% by weight of pentabromodiphenyl ethane, about 70 to about 85% by weight of hexabromodiphenyl ethane, about 10 to about 20% by weight of heptabromodiphenyl ethane, and about 1 to about 5% by weight of octabromodiphenyl ethane.

In another exemplary embodiment of the present invention, the brominated diphenyl ethane mixture may comprise about 0.1 to about 1% by weight of pentabromodiphenyl ethane, about 55 to about 75% by weight of hexabromodiphenyl ethane, about 10 to about 15% by weight of heptabromodiphenyl ethane, about 10 to about 25% by weight of octabromodiphenyl ethane, and about 3 to about 9% by weight of nonabromodiphenyl ethane.

The thermoplastic resin composition according to the present invention may comprise about 1 to about 6 parts by weight of antimony oxide based on about 100 parts by weight of rubber modified aromatic vinyl copolymer resin (A).

Further, the resin composition may comprise one or more additives. Exemplary additives include without limitation flame retardants, flame retarding aids, anti-dripping agents, heat stabilizers, release agents, weatherability stabilizers, halogen stabilizers, lubricants, fillers, coupling agents, light stabilizers, antioxidants, coloring agents, antistatic agents, impact modifiers, a plasticizer, and the like, and combinations thereof.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Rubber Modified Aromatic Vinyl Copolymer Resin

The rubber modified aromatic vinyl copolymer resin according to the present invention is a polymer resin wherein grafted rubbery polymers are dispersed in the form of particles in a matrix of vinyl copolymer.

The rubber modified aromatic vinyl copolymer resin is prepared by polymerizing grafted rubbery polymers, aromatic vinyl monomers, and optionally monomers polymerizable with the aromatic vinyl monomers. In an embodiment of the present invention, the rubber modified aromatic vinyl copolymer resin (A) comprises about 20 to about 50% by weight of grafted rubbery polymers, about 40 to about 60% by weight of aromatic vinyl monomers, and about 10 to about 30% of cyanide vinyl monomers.

The rubber modified aromatic vinyl copolymer resin can be prepared by polymerizing aromatic vinyl monomer and a monomer copolymerizable with the aromatic vinyl monomer in the presence of a rubbery polymer. The rubber modified aromatic vinyl copolymer resins are prepared by known methods such as emulsion polymerization, solution polymerization, suspension polymerization, or bulk polymerization.

The rubber modified aromatic vinyl copolymer resin can be produced by preparing separately a graft copolymer resin (A1) typically having a high rubber content and an aromatic vinyl copolymer resin (A2) which does not contain rubber and mixing them together. In bulk polymerization, the rubber modified aromatic vinyl copolymer resin can be prepared in one process without separately preparing the graft copolymer resin (A1) and the aromatic vinyl copolymer resin (A2). In either case, the rubber content in a final rubber modified aromatic vinyl copolymer resin can range from about 1 to about 30% by weight. The Z-average particle size of the rubber in the rubber modified aromatic vinyl copolymer resin can range from about 0.1 to 6.0 µm, for example about 0.25 to about 3.5 µm.

In the rubber modified aromatic vinyl copolymer resin, the graft copolymer resin (A1) can be used alone or in combination with a copolymer resin (A2) which does not contain rubber, depending on the compatibility thereof.

(A1) Graft Copolymer Resin

The graft copolymer resin (A1) useful in the present invention may be prepared by adding an aromatic vinyl monomer, a monomer copolymerizable with the aromatic vinyl monomer, and optionally a monomer providing processability and heat resistance to a rubbery polymer and polymerizing them together.

Examples of the rubbery polymer suitable for preparing the graft copolymer resin may include without limitation diene rubbers such as butadiene rubber, styrene-butadiene copolymer, acrylonitrile-butadiene copolymer, and the like; saturated rubbers in which hydrogen is added to a diene rubber; isoprene rubbers; acryl rubbers such as butyl acrylate and the like; and ethylene/propylene/diene terpolymers (EPDM), and the like, and combinations thereof. The content of the rubber in the graft copolymer resin (A1) may be about 5 to about 65% by weight. The average size of rubber particles may be in the range of from about 0.1 to about 4 µm, and can be readily determined by the skilled artisan depending on the desired impact strength and surface appearance.

Examples of the aromatic vinyl monomer that can be graft-copolymerized onto the rubber may include without limitation styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, and the like. These can be used singly or as a combination of at least two or more thereof. The graft copolymer resin (A1) may include the aromatic vinyl monomer in an amount of about 34 to about 94% by weight.

Examples of the monomer copolymerizable with the aromatic vinyl monomer may include without limitation vinyl cyanide such as acrylonitrile, unsaturated nitrile compound such as ethacrylonitrile and methacrylonitrile, and the like. These can be used singly or as a combination of at least two or more thereof. The graft copolymer resin (A1) may include the copolymerizable monomer in an amount of about 1 to about 30% by weight.

Examples of the monomer providing processability and heat resistance may include without limitation acrylic acid, methacrylic acid, maleic acid anhydride, N-substituted maleimide and the like, and combinations thereof. The graft copolymer resin (A1) may include the monomer providing processability and heat resistance in an amount of about 1 to about 30% by weight.

(A2) Aromatic Vinyl Copolymer Resin

The aromatic vinyl copolymer resin (A2) of the present invention may be prepared by copolymerizing the same components as the graft copolymer resin (A1) except the rubber component. The aromatic vinyl copolymer resin (A2) may be prepared by copolymerizing an aromatic vinyl monomer, a monomer copolymerizable with the aromatic vinyl monomer, and optionally a monomer providing processability and heat resistance.

Examples of the aromatic vinyl monomer may include without limitation styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, and the like. These can be used singly or as a combination of at least two or more thereof. The aromatic vinyl copolymer resin (A2) may include the aromatic vinyl monomer in an amount of about 60 to about 90% by weight.

Examples of the monomer copolymerizable with the aromatic vinyl monomer may include without limitation vinyl cyanide such as acrylonitrile, unsaturated nitrile compounds such as ethacrylonitrile and methacrylonitrile, and the like. These can be used singly or as a combination of at least two or more thereof. The aromatic vinyl copolymer resin (A2) may include the copolymerizable monomer in an amount of about 10 to about 40% by weight.

Examples of the monomer providing processability and heat resistance may include acrylic acid, methacrylic acid, maleic acid anhydride, N-substituted maleimide and the like, and combinations thereof. The aromatic vinyl copolymer resin (A2) may include the monomer providing processability and heat resistance in an amount of about 0 to about 30% by weight.

Examples of the rubber modified aromatic vinyl copolymer resin may include without limitation acrylonitrile-butadiene-styrene copolymer resin (ABS), acrylonitrile-acryl rubber-styrene copolymer resin (AAS), acrylonitrile-ethylene propylene rubber-styrene copolymer resin (AES), and the like, and combinations thereof.

In exemplary embodiments of the invention, the rubber modified aromatic vinyl copolymer resin comprises about 10 to about 100% by weight of a graft copolymer resin (A1) and about 0 to about 90% by weight of an aromatic vinyl copolymer resin (A2). For example, the rubber modified aromatic vinyl copolymer resin can comprise about 55 to about 90% by weight of a graft copolymer resin (A1) and about 10 to about 45% by weight of an aromatic vinyl copolymer resin (A2). In another embodiment of the invention, the rubber modified aromatic vinyl copolymer resin comprises about 15 to about 50% by weight of a graft copolymer resin (A1) and about 50 to about 85% by weight of an aromatic vinyl copolymer resin (A2).

(B) Brominated Diphenyl Ethane Mixture

In an exemplary embodiment of the present invention, a brominated diphenyl ethane mixture of the present invention can be prepared by adding about 5.5 to about 7.7 moles of bromine to diphenyl ethane; reacting diphenyl ethane with the added bromine; and refining brominated diphenyl ethane from a mixture of reaction products. In another exemplary embodiment, the brominated diphenyl ethane mixture may be prepared by injecting bromine into a reactor filled with diphenyl ethane, a solvent and a catalyst and reacting bromine with diphenyl ethane for about 0.5 to about 24 hours while the reactor is maintained at a temperature of about −20 to about 35° C.

The catalyst can include without limitation a metal, a bromide or a chloride of a metal, including a bromide or a chloride of aluminum or antimony, or a combination thereof. Exemplary catalysts include without limitation Al, Sb, Fe, Ti, Sn, Be, Cd, Zn, B, Bi, Zr, $AlCl_3$, $SbCl_3$, $SbCl_5$, $SbBr_3$, $SbClBr_4$, $SbBrCl_4$, $FeCl_3$, $FeBr_3$, $TiCl_4$, $TiBr_4$, $SnCl_2$, $SnBr_3$, $SnCl_4$, $AlBr_3$, $BeCl_2$, $CdCl_2$, $ZnCl_2$, $BF_4$, $BCl_3$, $BBr_3$, $BiCl_3$, $ZrCl_4$ and the like, and combinations thereof. In exemplary embodiments, the catalyst can be, for example, a bromide or a chloride of iron (Fe), titanium (Ti) or antimony (Sb), or a combination thereof, such as $FeCl_3$ and $FeBr_3$. The catalyst may be used in an amount of about 0.01 to about 3 moles per about 1 mole of diphenyl ethane.

In one embodiment based on an area ratio in a GC/MS (Gas Chromatography/Mass Spectrometry) analysis, the brominated diphenyl ethane mixture (B) may comprise about 55 to about 85% by weight of hexabromodiphenyl ethane, which can provide excellent weatherability, for example 57 to about 85% by weight of hexabromodiphenyl ethane, as another example about 65 to about 85% by weight of hexabromodiphenyl ethane, and as another example about 70 to about 85% by weight of hexabromodiphenyl ethane.

In the present invention, the amount of bromodiphenyl ethane having an odd number of bromine substituents such as pentabromodiphenyl ethane, heptabromodiphenyl ethane, and nonabromodiphenyl ethane shall be limited. As used in this application, reference to bromodiphenyl ethane having an odd number of bromine substituents means pentabromodiphenyl ethane, heptabromodiphenyl ethane, nonabromodiphenyl ethane, and combinations thereof. If the bromodiphenyl ethane includes an odd number of bromine substituents, it may be structurally unstable and can thereby deteriorate thermal properties or weatherability and discoloration phenomena of resins.

In an exemplary embodiment, the brominated diphenyl ethane mixture may comprise about 1 to about 25% by weight of a mixture of pentabromodiphenyl ethane, heptabromodiphenyl ethane, and nonabromodiphenyl ethane, for example about 3 to about 20% by weight, as another example about 5 to about 15% by weight, and as another example about 5 to about 10% by weight. In another exemplary embodiment, the brominated diphenyl ethane mixture may comprise about 10 to about 25% by weight of bromodiphenyl ethane having an odd number of bromine substituents.

In one embodiment based on an area ratio in a GC/MS analysis, the brominated diphenyl ethane mixture may comprise about 0 to about 17% by weight of pentabromodiphenyl ethane, about 55 to about 85% by weight of hexabromodiphenyl ethane, about 0.5 to about 17% by weight of heptabromodiphenyl ethane, about 0 to about 25% by weight of octabromodiphenyl ethane, and about 0 to about 9% by weight of nonabromodiphenyl ethane.

In another embodiment, the brominated diphenyl ethane mixture may comprise about 0 to about 2% by weight of pentabromodiphenyl ethane, about 60 to about 85% by weight of hexabromodiphenyl ethane, about 1 to about 15% by weight of heptabromodiphenyl ethane, about 5 to about 25% by weight of octabromodiphenyl ethane, about 0 to about 7% by weight of nonabromodiphenyl ethane, and about 0 to about 5% by weight of decabromodephenyl ethane.

In another embodiment, the brominated diphenyl ethane mixture may comprise about 7 to about 17% by weight of pentabromodiphenyl ethane, about 75 to about 85% by weight of hexabromodiphenyl ethane, and about 3 to about 8% by weight of heptabromodiphenyl ethane.

In another embodiment, the brominated diphenyl ethane mixture may comprise about 0.1 to about 5% by weight of pentabromodiphenyl ethane, about 70 to about 85% by weight of hexabromodiphenyl ethane, about 10 to about 20% by weight of heptabromodiphenyl ethane, and about 1 to about 5% by weight of octabromodiphenyl ethane.

In another embodiment, the brominated diphenyl ethane mixture may comprise about 0.1 to about 1% by weight of pentabromodiphenyl ethane, about 55 to about 75% by weight of hexabromodiphenyl ethane, about 10 to about 15% by weight of heptabromodiphenyl ethane, about 10 to about 25% by weight of octabromodiphenyl ethane, and about 3 to about 9% by weight of nonabromodiphenyl ethane.

An average number of the substituted bromines in the brominated diphenyl ethane mixture according to the present invention can be about 5.5 to about 7.7, for example about 6 to about 7.5.

In another embodiment, since the brominated diphenyl ethane mixture may comprise about 55 to about 85% by weight of hexabromodiphenyl ethane and about 1 to about 25% by weight of bromodiphenyl ethane having an odd number of bromine substituents, it may be structurally stable and may not thereby deteriorate thermal properties or weatherability and discoloration phenomena of resins.

The flame retardant thermoplastic resin compositions according to the present invention comprises about 100 parts by weight of a rubber-modified aromatic vinyl copolymer resin (A), and about 10 to about 30 parts by weight of a brominated diphenyl ethane mixture (B), for example about 10 to about 25 parts by weight, and as another example about 13 to about 20 parts by weight. If the brominated diphenyl ethane mixture is used in an amount less than about 10 parts by weight, sufficient flame retardancy may not be obtained. On the other hand, if the brominated diphenyl ethane mixture is used in an amount greater than about 30 parts by weight, impact strength or flowability may become poor.

Further, the flame retardant thermoplastic resin compositions may comprise one or more additives. Exemplary additives include without limitation flame retardants, flame retarding aids, anti-dripping agents, heat stabilizers, release agents, weatherability stabilizers, halogen stabilizers, lubricants, fillers, coupling agents, light stabilizers, antioxidants, coloring agents, antistatic agents, impact modifiers, and the like, and combinations thereof.

The flame retardant according to the present invention may comprise other halogen-based flame retardants such as bromine-based flame retardants. Phosphorous-based flame retardants may also used. Examples of the bromine-based flame retardants may include without limitation tetrabromobisphenol A, decabromodiphenyl oxides, decabrominated di-phenyl ethanes, 1, 2-bis(tribromophenyl)ethanes, brominated epoxy oligomers with a weight average molecular weight of about 600 to about 8,000 g/mol, octabromotrimethyl phenyl indanes, bis(2, 3-dibromopropyl ether), tris(tribromophenyl) triazines, brominated aliphatic and aromatic hydrocarbons, and the like. The flame retardant may be used singly or in combination of two or more thereof.

In this invention, a flame retarding aid may be used along with the flame retardants. The flame retarding aid may comprise an antimony oxide including antimony trioxide, antimony pentoxide, or a combination thereof. The particle size of antimony trioxide may be in the range of about 0.01 to about 6.0 μm, for example about 0.02 to about 3.0 μm. The particle size of antimony pentoxide may be in the range of about 0.01 to about 1.0 μm, for example about 0.02 to about 0.5 μm. The flame retarding aid may be used in an amount of about 1 to about 6 parts by weight per about 100 parts by weight of a rubber-modified aromatic vinyl copolymer resin (A), for example about 1 to about 5 parts, and as another example about 3 to about 5 parts. When using a flame retarding agent in an amount greater than about 6 parts by weight, balanced physical properties may not be obtained.

A resin composition of the present invention may be prepared in the form of pellets by melt-extruding the mixture in an extruder after simultaneously mixing the aforementioned components with other (optional) additives. The prepared pellets may be produced into various molded articles through diverse molding methods including injection molding, extrusion molding, vacuum molding, and casting molding.

In a still further aspect of the present invention, there is provided a molded article obtained by molding the aforementioned resin composition. The molded article may be used in a wide range of exterior materials for electronic products, automobile parts, computer housings, and housings for other business machines since the molded article can have excellent impact resistance, flowability, and flame resistance.

When the thermoplastic resin is an acrylonitrile butadiene styrene (ABS) copolymer, the molded article can have an Izod impact strength of about 12 to 60 kgf·cm/cm for a ⅛" thick sample measured according to ASTM 256, A molded article according to the present invention can have a melt flow index of about 3.4 to 6 g/10 min measured at 200° C./5 kg according to ASTM D-1238, for example about 3.5 to 5.5 g/10 min.

A molded article according to the present invention can have an Izod impact strength of about 23 to about 60 kgf·cm/cm for a ⅛" thick sample measured according to ASTM 256, for example about 24 to about 50 kgf·cm/cm The invention may be better understood by reference to the following examples which are intended for the purpose of illustration and are not to be construed as in any way limiting the scope of the present invention, which is defined in the claims appended hereto.

EXAMPLES (A) Rubber Modified Aromatic Vinyl Resin (A1) Graft Copolymer Resin: Graft ABS Copolymer Resin 50 parts of butadiene rubber latex (solid content), 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added, coagulated and dried to obtain graft ABS copolymer resin (g-ABS) in powder form.

(A2) Aromatic Vinyl Copolymer Resin: San Copolymer Resin 75 parts of styrene, 25 parts of acrylonitrile, 120 parts of deionized water and 0.2 parts of azobisisobutylonitrile (AIBN) are mixed. To the mixture, 0.4 parts of tricalciumphosphate and 0.2 parts of mercaptan-containing chain transfer agent are added. The resultant solution is heated to 80° C. for 90 minutes and kept for 180 minutes. The resultant product is washed, dehydrated and dried to obtain styrene-acrylonitrile copolymer resin (SAN) in powder form.

(B) Brominated Diphenyl Ethane Mixture

The brominated diphenyl ethane mixtures are prepared by adding 5.0 to 7.7 moles of bromine to 1 mole of diphenyl ethane to substitute hydrogens in diphenyl ethane with bromines. Compositions of the prepared brominated diphenyl ethane mixtures are represented in the following Table 1. Analyses of the synthesized brominated diphenyl ethane mixtures are performed using a GC/MS after diluting given samples to a dilution factor of 2000 (0.5 mg/mL) with toluene to thereby completely dissolve the samples. Agilent 7683 injector-GC Agilent 7890N-MSD Agilent 5975C is used as measuring instruments. Measuring conditions are as follows: an inlet temperature is 320° C., a split ratio is splitless, a column is DB-5HT, a column flow rate is 1.0 ml/min, an oven temperature program is 40° C. (2 min)-40° C./min→200° C.-10° C./min→260° C.-20° C./min→340° C. (2 min), and an MS interface temperature is 280° C. The qualitative analysis is conducted by injecting 1 μl into a GC/MSD using an auto-sampler. The respective measured compositions are used based on the area. The Br content analysis is carried out using an IC. Br contents of the samples are measured by drawing up calibration curves using an IC-500 after injecting an excessive amount of oxygen into the sample and burning the samples using the injected oxygen.

TABLE 1

| composition | Br-DPE #1 (Br 5.9 moles) | Br-DPE #2 (Br 6.5 moles) | Br-DPE #3 (Br 7.2 moles) | Br-DPE #4 (Br 7.7 moles) |
|---|---|---|---|---|
| | area ratio (%) | | | |
| Br5 | 15.8 | 1.8 | 0.8 | 0.9 |
| Br6 | 77.4 | 78.5 | 66.2 | 56.9 |
| Br7 | 6.8 | 15.8 | 14.8 | 14.2 |
| Br8 | — | 3.9 | 13.1 | 19.5 |
| Br9 | — | — | 5.1 | 8.5 |
| Br content | 72.7% | 73.7% | 74.7% | 75.1% |

Examples 1 to 11

After adding the respective foregoing components, antimony trioxide (ANTIS-W) as flame retarding aid by a Korean manufacturer (Ilsung Antimon Co.) and "Irganox 1076" as thermal stabilizing agent in the amounts represented in the following Table 2, the components are uniformly mixed in a Henschel mixer for 3 to 10 minutes. Pellets are produced by extruding the mixture at an extrusion temperature of 180 to 280° C., a screw-rotating speed of 150 to 300 rpm and a composition feeding rate of 30 to 60 kg/hr in an ordinary twin extruder. After drying the produced pellets at 100° C. for 4 hours, samples are prepared by injecting the dried pellets using a 6-Oz injector under conditions of a molding temperature of 180 to 280° C. and a mold temperature of 40 to 80° C. Physical properties of the samples are measured by the following methods and shown in Table 2.

(1) Fluidity: Melt flow indexes (g/10 min) of the samples are measured according to ASTM D-1238 and are measured at 200° C./5 kg.

(2) Izod impact strengths (kgf·cm/cm) of samples with a thickness of ⅛" are measured according to ASTM 256.

(3) Flame retardancies of samples with a thickness of 2.5 mm are measured according to UL 94 VB flame resistance regulations.

(4) Thermal stability: Samples with a thickness of 2 mm are molded with a pin point gate. 7 samples are molded by performing the injection molding operation at 250° C. again after allowing resin to stay in the injector for 5 minutes while continuously performing an injection molding operation. The surface of the samples is observed whether gas generates on the surface. The number means the samples on which gas generates. The smaller the number is, the better the thermal stability is.

TABLE 2

| | | Examples | | | | | | | |
|---|---|---|---|---|---|---|---|---|---|
| | | 1 | 2 | 3 | 4 | 5 | 6 | 7 | 8 |
| (A) | (A1)g-ABS | 25 | 25 | 25 | 25 | 30 | 30 | 30 | 30 |
| | (A2)SAN | 75 | 75 | 75 | 75 | 70 | 70 | 70 | 70 |
| (B) | Br-DPE #1 | 15 | — | — | — | 18 | — | — | — |
| | Br-DPE #2 | — | 15 | — | — | — | 18 | — | — |
| | Br-DPE #3 | — | — | 15 | — | — | — | 18 | — |
| | Br-DPE #4 | — | — | — | 15 | — | — | — | 18 |
| Sb2O3 | | 4 | 4 | 4 | 4 | 5 | 5 | 5 | 5 |
| thermal stabilizing agent | | 0.3 | 0.3 | 0.3 | 0.3 | 0.4 | 0.4 | 0.4 | 0.4 |
| Melt Flow Index | | 4.5 | 4.3 | 4.6 | 4.6 | 3.7 | 3.6 | 3.9 | 4.0 |
| impact strength | | 26.6 | 27.8 | 25.0 | 24.5 | 32.1 | 33.8 | 29.8 | 29.0 |
| flame retardency | | V-0 | V-0 | V-0 | V-0 | V-0 | V-0 | V-0 | V-0 |
| Thermal stability | | 2 | 1 | 1 | 1 | 2 | 2 | 1 | 1 |

Comparative Examples 1 to 8

Comparative Examples 1 to 8 are prepared in the same manner as Example 1 except using the amounts of the components as shown in Table 3.

TABLE 3

| | | Comparative Examples | | | | | | | |
|---|---|---|---|---|---|---|---|---|---|
| | | 1 | 2 | 3 | 4 | 5 | 6 | 7 | 8 |
| (A) | (A1)g-ABS | 25 | 25 | 25 | 25 | 30 | 30 | 30 | 30 |
| | (A2)SAN | 75 | 75 | 75 | 75 | 70 | 70 | 70 | 70 |
| Br flame retardant | SAYTEX 8010[1] | 13.5 | — | — | — | 16 | — | — | — |
| | SAYTEX CY-2000[2] | — | 18.5 | — | — | — | 22.5 | — | — |
| | CXB-714C[3] | — | — | 18.5 | — | — | — | 22 | — |
| | FR-245[4] | — | — | — | 16.5 | — | — | — | 19.5 |
| Sb2O3 | | 4 | 4 | 4 | 4 | 5 | 5 | 5 | 5 |
| Thermal stabilizing agent | | 0.3 | 0.3 | 0.3 | 0.3 | 0.4 | 0.4 | 0.4 | 0.4 |
| Melt Flow Index | | 2.7 | 6.5 | 4.3 | 4.2 | 2.3 | 5.8 | 3.5 | 3.4 |

TABLE 3-continued

|  | Comparative Examples | | | | | | | |
|---|---|---|---|---|---|---|---|---|
|  | 1 | 2 | 3 | 4 | 5 | 6 | 7 | 8 |
| impact stength | 9.6 | 21.1 | 16.5 | 25.9 | 11.3 | 23.7 | 21.5 | 30.6 |
| Flame reatardency | V-1 | V-0 | V-0 | V-0 | V-0 | V-0 | V-0 | V-0 |
| Thermal stability | 1 | 5 | 3 | 3 | 1 | 5 | 4 | 3 |

Notes:
[1] ethane-1,2-bis(pentabromophenyl) with a bromine content of 82 weight % manufactured by Albermarle Company.
[2] tetrabromobisphenol A with a bromine content of 58 weight % manufactured by Albermarle Company.
[3] brominated epoxy oligomer with a bromine content of 59 weight % manufactured by Woojin Polymer Company.
[4] 2,4,6-tris(2,4,6-tribromophenoxy)-1,3,5-triazine with a bromine content of 67 weight % manufactured by ICL Company.

As illustrated in Tables 2 and 3, Examples 1 to 8 which include a brominated diphenyl ethane mixture show a good balance of flame retardancy, impact strength and thermal stability as compared to Comparative Examples 1 to 8.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic resin composition, comprising about 100 parts by weight of a rubber-modified aromatic vinyl copolymer resin (A) and about 10 to about 30 parts by weight of a brominated diphenyl ethane mixture (B), wherein said brominated diphenyl ethane mixture (B) comprises about 0.1 to about 1% by weight of pentabromodiphenyl ethane, about 55 to about 75% by weight of hexabromodiphenyl ethane, about 10 to about 15% by weight of heptabromodiphenyl ethane, about 10 to about 25% by weight of octabromodiphenyl ethane, and about 3 to about 9% by weight of nonabromodiphenyl ethane.

2. The flame retardant thermoplastic resin composition as claimed in claim 1, wherein said rubber-modified aromatic vinyl copolymer resin (A) comprises about 10 to about 100% by weight of a graft copolymer resin (A1) and about 0 to about 90% by weight of an aromatic vinyl copolymer resin (A2).

3. The flame retardant thermoplastic resin composition as claimed in claim 1, wherein said brominated diphenyl ethane mixture (B) comprises about 1 to about 25% by weight of diphenyl ethane having an odd number of bromine substituents.

4. The flame retardant thermoplastic resin composition as claimed in claim 1, further comprising antimony oxide in an amount of about 1 to about 6 parts by weight per about 100 parts by weight of the rubber-modified aromatic vinyl copolymer resin (A).

5. The flame retardant thermoplastic resin composition as claimed in claim 1, wherein the resin composition comprises an additive selected from a flame retardant, a flame retarding aid, an anti-dripping agent, a heat stabilizer, a release agent, a weatherability stabilizer, a halogen stabilizer, a lubricant, a filler, a coupling agent, a light stabilizer, an antioxidant, a coloring agent, an antistatic agent, an impact modifier, a plasticizer, or a combination thereof.

6. An article formed of the composition of claim 1.

* * * * *